United States Patent [19]

Tsinberg

[11] Patent Number: 4,873,567
[45] Date of Patent: Oct. 10, 1989

[54] EXTENDED HORIZONTAL RESOLUTION OF LUMINANCE AND CHROMINANCE IN A HIGH DEFINITION TELEVISION SYSTEM

[75] Inventor: Mikhail Tsinberg, Riverdale, N.Y.

[73] Assignee: U.S. Philips Corporation, New York, N.Y.

[21] Appl. No.: 84,968

[22] Filed: Aug. 13, 1987

[51] Int. Cl.$^4$ ............................................... H04N 7/04
[52] U.S. Cl. ...................................... 358/12; 358/141; 358/11
[58] Field of Search ................... 358/12, 11, 15, 21 R, 358/31, 16

[56] References Cited

U.S. PATENT DOCUMENTS 4,521,803  6/1985  Gittinger .............................. 358/12
4,622,578  11/1986  Rzeszewski .......................... 358/12

OTHER PUBLICATIONS

Turner, R., "Some Thoughts on Using Comb Filters in the Broadcast Television Transmitter and at the Receiver", IEEE Transactions on Consumer Electronics, vol. CE-23, No. 3, 8/77, pp. 248-257.

Primary Examiner—James J. Groody
Assistant Examiner—David E. Harvey
Attorney, Agent, or Firm—Algy Tamoshunas; Leroy Eason

[57] ABSTRACT

Method and apparatus for extending the horizontal resolution of the luminance and chrominance video signals in a two-channel HDTV system, requiring no increase in channel bandwidth. High-frequency components of luminance and chrominance of a wide bandwidth source signal are bandpass filtered, vertically decimated, time expanded, and heterodyned into frequency interleaved relationship with each other and with a line differential signal to produce an enhancement package carried in a designated time and frequency slot on the second channel. At the receiver, the various signal components are recombined to substantially reproduce the source signal for display.

6 Claims, 7 Drawing Sheets

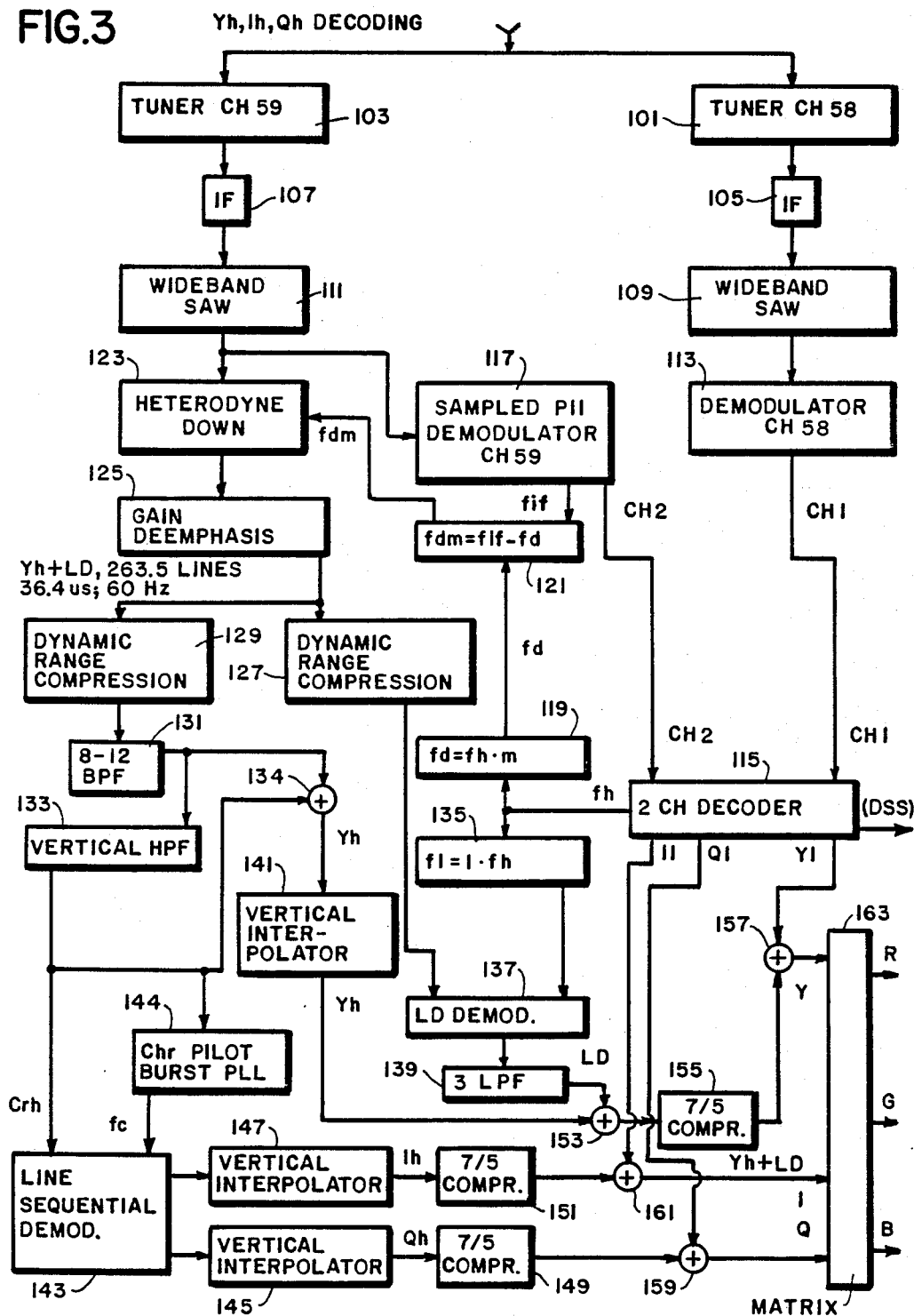
FIG.3 Yh, Ih, Qh DECODING

FIG.6 — (b) INTERLEAVING Yh & Crh   (c) INTERLEAVING Yh & LD

CH-2 LINE TIME FORMAT

| 1 us | 36.4 us | 9 us | 9 us | 5 us | 1 us |
|---|---|---|---|---|---|
| LD CLAMP +Crh BURST | LD+Yh+Crh  63.555us−61.4us=2.2us (STITCH OVERLAP) | Pl | Pr | DSS | Cl |

DYNAMIC RANGE IMPROVEMENT OF 1.4 FOR LD+Yh PACKET  S/N ~3db IMPROVEMENT

EXTENDED HORIZONTAL RESOLUTION OF LUMINANCE AND CHROMINANCE IN A HIGH DEFINITION TELEVISION SYSTEM

BACKGROUND OF THE INVENTION

1. Field of the Invention

This invention pertains generally to high definition wide aspect ratio (e.g. 16:9, also referred to as 5⅓:3) television systems. More particularly, it pertains to methods and apparatus for providing improved horizontal resolution of luminance and chrominance in high definition television systems that decompose and repackage the high definition wide aspect ratio image signal into two signals for distribution over two channels. The first signal is a center image signal transmitted via a first channel in standard (e.g., NTSC) format and when received by a standard television receiver, produces the center image having a 4:3 aspect ratio. The second signal is an enhancement signal transmitted via a second channel. The enhancement signal contains, among other information, side panel image signals which, together with the center image signal, enable a two channel receiver to reproduce the original wide aspect ratio image. The enhancement signal also carries additional information for the center image that cannot be accommodated by a standard TSC signal.

2. Description of Related Art

Various features of such a system are described and illustrated in U.S. Pat. No. 4,694,338 "A High Definition Television System" and U.S. patent application, Ser. No. 06/931,756, filed Nov. 17, 1986, "1-Channel Video Signal Delivery System", both in the name of Mikhail Tsinberg, common assignee; U.S. patent application, Ser. No. 057,849, filed June 2, 1987 "Decomposition and Recombination of a Wide Aspect Ratio Image"; U.S. patent application, Ser. No. 057,847, filed June 2, 1987. "Methods and Apparatus for Transmitting Augmentation Panel Components on One Channel of a Two Channel Wide Aspect Ratio Television Signal Transmission System"; U.S. patent application, Ser. No. 057,848, filed June 2, 1987 "Improved Method and Apparatus for Recombining a Main Panel Component with an Augmentation Panel Component to Create a Wide Aspect Ratio Television Display"; and U.S. patent application, Ser. No. 07/057,880, filed June 2, 1987 "Method and Apparatus for Demodulating Color Television Chrominance Signals", all in the names of Mikhail Tsinberg, Carlo Basile, and Alan P. Cavallerano, common assignee.

While some enhancement of the center image signal that is compatible with standard receivers is possible, utilization of the available bandwidth is limited by the standard broadcast format. Given this limitation on the utilization of the bandwidth of the first channel, it is desirable to achieve increased utilization of the available bandwidth in the second channel.

SUMMARY OF THE INVENTION

In order to achieve improved utilization of the available bandwidth of the second channel, the enhancement signal is packaged to contain a time expanded line differential (LD) signal generated during the active line time of a high definition television (HDTV) signal source, for example, 525 lines per frame, 59.94 frames per second, progressive scan. The LD signal contains vertical detail and temporal information necessary to deinterlace the NTSC-compatible video signal at the two channel receiver. Prefiltered sequential-line high frequency horizontal chrominance information is frequency interleaved with prefiltered alternate-line high frequency luminance information in a manner analogous to the chrominance and luminance components of standard NTSC signals. The extended horizontal resolution luminance and chrominance information is packaged with the LD detail signal in a unique way, not existing as a complete package at baseband, and then heterodyned on a channel carrier by single sideband amplitude modulation. The enhancement signal further comprises video information for the two side panels and digital stereo sound and sync (DSS) signals. Eliminating the standard horizontal blanking interval and time expanding and gain preemphasizing the analog components of the enhancement signal improves the signal to noise ratio thereof and achieves additional utilization of the available bandwidth of the second channel.

Accordingly, it is an object of the present invention to provide enhanced horizontal resolution of the luminance and chrominance video signals in a two-channel high definition television system.

It is a further object of the present invention to provide improved utilization of the available bandwidth in the second channel of a two-channel high definition television system.

BRIEF DESCRIPTION OF THE DRAWING

FIG. 3 is a block diagram of a two channel recombination processor according to the present invention.

FIG. 6 is a conventional one-dimensional representation of the components of the enhancement package.

DETAILED DESCRIPTION OF THE PREFERRED EMBODIMENTS

Figure 1:
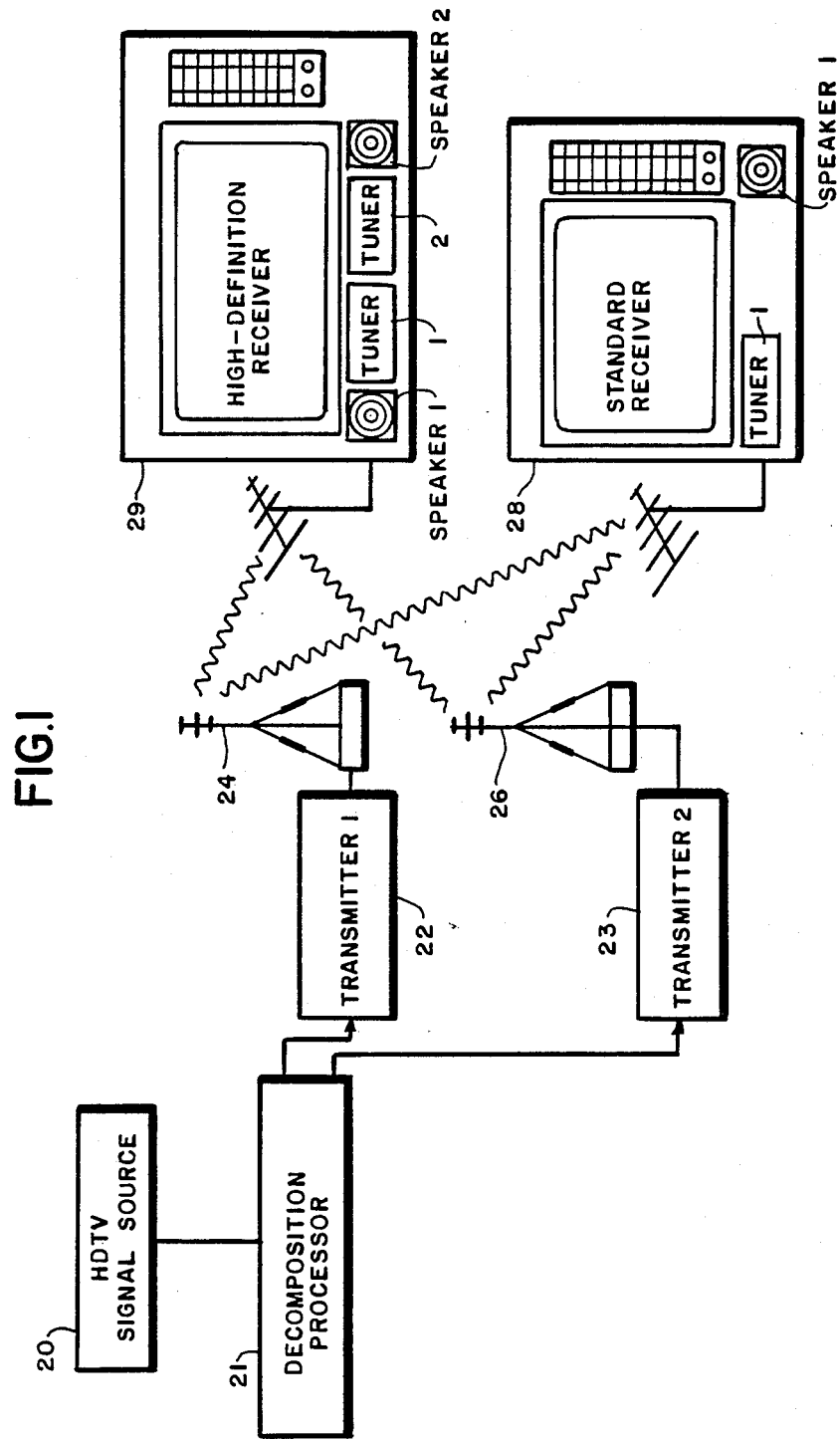
FIG. 1 is a simplified block diagram of a two-channel HDTV system.

FIG. 1 shows in block diagram form a simplified presentation of a two-channel high definition television (HDTV) system having one channel compatible with a standard television broadcast format, for example, NTSC. Wide bandwidth RGB signals and high fidelity stereo sound signals (analog or digital) from an HDTV source 20 are delivered to a decomposition processor 21 which decomposes the single channel HDTV signal into a center image signal and an enhancement signal. The source signal may be 525 lines per frame progressive scan, 59.94 frames per second, aspect ratio 16:9. The center image signal is derived from the progressively scanned HDTV signal by extracting a central portion of every other horizontal line of video information and time-expanding and interlacing to fit the standard NTSC format. The enhancement signal is also produced in the decomposition processor 21 and comprises a line differential (LD) signal, a digital stereo sound (DSS) signal, and the extended horizontal definition signal or enhancement package that will be described more completely below. Time-expansion, placing the resultant center image signal in the NTSC format, and generation of the line differential signal are described in the above-noted U.S. Pat. No. 4,694,338.

The first or center image signal that is compatible with NTSC may be transmitted via a first transmitter 22 and antenna 24. The second or enhancement signal may be transmitted by a second transmitter 23 and antenna 26. It will be understood that transmitters 22 and 23 may also represent cable television head end equipment for distributing the center image signal and enhancement signal on two cable television channels.

The center image signal transmitted via transmitter 22 and antenna 24 may be received by a standard television receiver 28 or an HDTV two-channel receiver 29. The standard receiver 28 will, when tuned to receive the center image signal, produce a substantially standard definition standard aspect ratio (4:3) picture. The standard receiver 28, when tuned to receive the enhancement signal from transmitter 23 and antenna 26 may reproduce the panel images, but generally speaking will not produce images or sound useful to viewers. The two-channel HDTV receiver 29, when receiving the center image signal from transmitter 22 and antenna 24 via a first tuner and the enhancement signal from transmitter 23 and antenna 26 via a second tuner, will produce a high definition wide aspect ratio (16:9) image and high fidelity stereo sound.

It will be understood that source 20 can take other forms, e.g. a wide bandwidth receiver for HDTV MAC (multiplexed analog component) signals, or other HDTV signal packages. These may be demodulated to produce red-green-blue (RGB) and audio signals to be processed by decomposition processor 21 substantially as described herein, or, depending on the format of the signals available in source 20, some modifications may be possible whereby transcoding from the single channel HDTV source to the two channel system can be simplified.

Figure 2A:
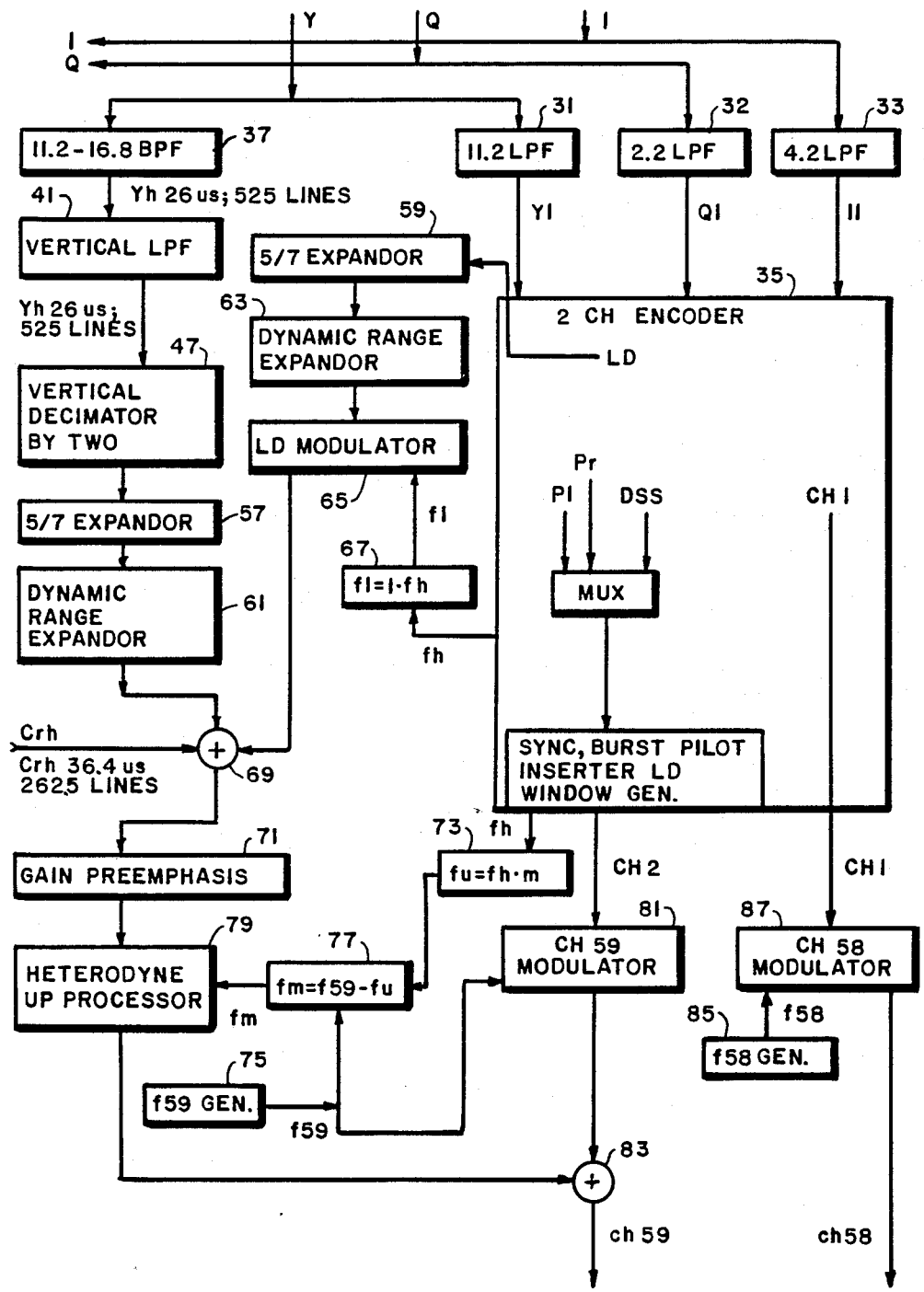
FIG. 2a and FIG. 2b are block diagrams showing the arrangement of the several parts of a decomposition processor according to the present invention.

HDTV signal source 20 may utilize wideband RGB signals having a nominal bandwidth of 16.8 MHz, 525 lines per frame progressively scanned, 59.94 frames per second, and an aspect ratio of 16:9. The wideband RGB signals are matrixed in source 20 to produce a luminance (Y) signal and chrominance (I and Q) components. The nominal bandwidths are 16.8 MHz for luminance and 6 MHz for each chrominance component. These signals are delivered to the decomposition processor 21, which is shown in greater detail in FIG. 2*a* and FIG. 2*b*, which may be viewed as two parts of a single FIG. 2.

The luminance signal Y and the chrominance components Q and I from source 20 are connected via low pass filters (LPF) 31, 32, 33, respectively, to a two channel encoder 35. LPF 31 limits the bandwidth of the luminance signal Y to 11.2 MHz. The resulting bandwidth limited signal is referred to as Y1. LPF 32 limits the bandwidth of the Q component to 2.2 MHz. The resulting component is referred to as Q1. LPF 33 limits the bandwidth of the I component to 4.2 MHz. The resulting component is referred to as I1. Signals Y1, Q1 and I1 provide the inputs to a two channel encoder 35 which is described in U.S. Pat. No. 4,694,338 referred to above. It will be understood by persons skilled in the art that the chrominance components I and Q could also be expressed as (R-Y) and (B-Y) components. For an explanation of these and other well-known conventions used in the television arts, the reader is referred to Benson, Television Engineering Handbook, McGraw-Hill, Inc., 1986.

The luminance signal Y and chrominance components Q and I from source 20 are also connected to bandpass filters (BPF) 37, 38, and 39, respectively. BPF 37 passes frequencies from 11.2–16.8 MHz. The resulting luminance signal is referred to as Yh. BPF 38 passes frequencies from 2–6 MHz. The resulting chrominance component is referred to as Qh. BPF 39 also passes frequencies from 2–6 MHz. The resulting chrominance component is referred to as Ih. It is necessary that the cross-overs of the low pass filters 31, 32, 33 and bandpass filters 37, 38, 39, respectively, allow for some overlap to permit correct spectral reconstruction of the wideband signal at the receiver.

It should be noted that other implementations could be used to produce Yh, Qh and Ih. For example, the low pass filtered signals Y1, Q1, and I1, could be subtracted from the wideband source signals Y, Q, and I, to produce Yh, Qh, and Ih. Also, each bandpass filter 37, 38, 39, could be replaced by a series arrangement of a low pass filter and a high pass filter. For example, filter 37 could be replaced by a low pass filter that passes frequencies below 16.8 MHz followed by a high pass filter that passes frequencies above 11.2 MHz.

The signals Yh, Qh, and Ih, are generated for each line of the 525 line progressive scan source, with a nominal active line time of 26 $\mu$sec. This is the active line time for one horizontal scan of the original wide aspect ratio signal. Only a center portion of each of these scans is used to produce the center image signal that is transmitted via the first channel. Yh, Qh, and Ih for an entire active line time, however, covering both the center image and the side panels, are utilized to produce the extended horizontal resolution portion of the enhancement signal.

The signals Yh, Qh and Ih are each vertically low pass filtered to limit vertical energy to 120 cycles per picture height (cph) by vertical low pass filters 41, 42, 43, respectively. After being vertically low pass filtered, the signals Yh, Qh and Ih are vertically decimated by two by vertical decimators 47, 48, and 49, respectively. Vertical decimation by two reduces the number of lines by a factor of 2.

Alternate lines of Qh and Ih are modulated by line sequential modulator 50 comprising an alternate line selector 52 and a modulator 51 so that the resultant signal may be frequency component interleaved with Yh. As in the case of standard NTSC chrominance and luminance interleaving, the modulating frequency fc must be an odd integer multiple of one-half the line rate. The frequency fc is chosen to shift each four MHz bandwidth chrominance signal (2–6 MHz) into the range of 11.2–15.2 MHz, which lies in the frequency range (11.2–16.8 MHz) of the luminance enhancement signal Yh at the output of decimator 47.

The frequency fc may be generated by a phase lock loop frequency multiplier 53 which receives a reference signal fh at the NTSC horizontal line rate (fh=15,734.25 Hz) from two channel encoder 35 and produces therefrom the chrominance component heterodyning frequency, fc.

Modulator 51 modulates fc with alternate lines of Qh and Ih selected by line selector 52. These modulated Qh and Ih components form a chrominance enhancement signal Crh. Modulator 51 is preferably a balanced modulator providing a double sideband suppressed carrier output signal. The lower sideband is removed by a high pass filter (HPF) 55.

The horizontal blanking interval (NTSC format) of the enhancement signal channel is not needed for horizontal sync, burst, etc. Further, because time buffering is used for the various signals or signal components, there is no need to provide any time for beam retrace at this point in the system. Thus, the horizontal blanking time of approximately 11 $\mu$sec. is available in the enhancement signal channel for the transmission of additional information. This time is used together with the approximately 26 $\mu$sec. of line time that has previously been used to transmit the line differential (LD) signal. See, U.S. Pat. No. 4,694,338 cited above. Thus, approximately 37 $\mu$sec. per total line time of 63.5 $\mu$sec. is available in the enhancement signal channel for the transmission of Yh and Crh.

It will be recalled, however, that Yh and Crh generated at the 525 line progressive scan rate have active line times of only 26 $\mu$sec. This permits a time expansion of 26:37. In the use of digital processing, it is desirable to work with small integer multipliers and dividers if at all possible. Therefore, the ratio of 26:37 may be approximated e.g., by 5:7, or by 3:4, or any other integer ratio suitable to the equipment being used. 5:7 will be used by way of example. Yh, Crh, and as will be described in more detail subsequently, the LD signal generated by two channel encoder 35, are time expanded by expanders 57, 58, 59, respectively. As a result, these components occupy approximately 36.4 $\mu$sec. of line time at the 15,734 Hz line rate.

An increase in the dynamic range of the Yh, Crh and LD signals is achieved by amplifiers 61, 62, 63, respectively, in order to exploit the elimination of the NTSC horizontal blanking interval on the enhancement signal channel and to thereby improve the signal to noise ratio (SNR) of these signals at the receiver. The gains of Yh and Crh are increased in amplifiers 61 and 62, respectively, by the ratio of 140IRE/120IRE, or a factor of 1.17. The gain of the LD signal is increased by the factor of 140 IRE/92.5 IRE, or 1.5. See Benson, Television Engineering Handbook, for a discussion and explanation of IRE units.

In order to package the enhancement components Yh, Crh, and LD so that they can be recovered at the receiver, a proper spectral allocation is required. By heterodyning Crh with fc, the frequency translated Crh is prepared to be frequency interleaved with Yh. The LD component is at baseband, however, and must be similarly heterodyned with an appropriate subcarrier in order to be interleaved with Yh above the frequency where Crh is interleaved with Yh. This is accomplished by modulator 65 which mixes the LD signal with a subcarrier having a frequency of fl which frequency translates 0 MHz of LD to the vicinity of 12.75 MHz.

The subcarrier frequency fl is generated by phase lock loop frequency multiplier 67 which receives a reference signal fh at the horizontal line rate (fh=15,734.25 Hz) from two channel encoder 35 and produces therefrom the LD component heterodyning frequency, or subcarrier, fl.

The Yh component and the frequency translated Crh and LD components are summed together in adder 69 to produce the enhancement package. The Crh spectra interleaves with the Yh spectra over most of the frequency range of Yh and the lower frequency portion of the LD spectra interleaves with the Yh spectra at the upper frequency range of Yh.

The frequency interleaved components at the output of adder 69 are given gain preemphasis at 71 to exploit the fact that the individual components comprising the enhancement package have a lower energy level than narrowband video signals that would otherwise occupy the second channel were it used for an NTSC signal.

Two channel encoder 35 processes the Y1, Q1 and I1 signals to produce the center image signal in NTSC format for transmission via the center image or first channel. It also produces from these signals the left panel signal Pl, the right panel signal Pr, time multiplexes them with the digital stereo sound (DSS) signal, inserts vertical sync and the training signal, and provides a time window for the enhancement package.

All of the components of the enhancement package are now in proper time relationship with each other, however, they are not in proper frequency relationship to be transmitted via a single channel. The enhancement package (Yh, Crh, LD) occupies 11.2–17.2 MHz. The enhancement or second channel output from two channel encoder 35 is at baseband. In order to assemble these components for transmission, they are each heterodyned up to the actual channel to be used, for example, channel 59.

Starting again with the frequency reference signal fh, a phase lock loop frequency multiplier 73 generates a signal fu having a frequency fu=fh·m, where m is an integer multiplier that places fu in the vicinity of 8 MHz. The master oscillator for the r.f. carrier of the broadcast channel to be used, in this example channel 59, is represented at 75 and denoted f59.

In mixer 77 fu is beat against f59 to produce a difference frequency signal fm. This heterodyning signal is used in modulator 79 to heterodyne the enhancement package up to the frequency allocation for channel 59. The second channel output signal from two channel encoder 35 is used to modulate f59 in modulator 81 to provide a signal within the channel 59 frequency allocation. Using appropriate time delay compensation and gain balancing, the enhancement package from modulator 76 will fit neatly within the LD window of the signal from modulator 81, and when summed in an adder 83 will produce the complete enhancement signal to be delivered to the channel 59 transmitter, which corresponds to transmitter 23 of FIG. 1.

The center image signal from two channel encoder 35 is modulated onto the center image channel r.f. carrier for transmission. In the present example, channel 58 is used for the center image signal. A master oscillator 85 provides the channel 58 carrier at a frequency of f58, which is in turn modulated by modulator 87 with the center image signal. The resulting signal goes to the channel 58 transmitter, which corresponds to transmitter 22 of FIG. 1.

FIG. 3 shows a functional block diagram of a two channel recombination processor for receiving the center image signal and the enhancement signal, separating the several components thereof, and processing and recombining them to reproduce substantially the original wide bandwidth RGB (or Y, Q and I) signals and high fidelity stereo sound signal of the source 20.

A first tuner 101 is provided for receiving the center image signal, which in the example used herein, is on channel 58. A second tuner 103 is provided for receiving the enhancement signal which, in the example used herein, is on channel 59.

The center image signal and the enhancement signal are brought to intermediate frequency by known techniques (local oscillator, mixer, etc.) at blocks 105 and 107, and VSB filtered by wideband surface acoustical wave (SAW) devices 109 and 111, respectively. The center image signal is demodulated by demodulator 113 to provide a baseband center image signal to a two channel decoder 115. The enhancement signal is demodulated by demodulator 117 to provide a baseband enhancement signal to two channel decoder 115. Two channel decoder 115 will not be covered in detail herein. Reference should be made to U.S. Pat. No. 4,694,338 cited above.

The baseband center image signal is NTSC compatible, containing a 4:3 ratio interlaced image. The baseband enhancement signal contains the time multiplexed NTSC left and right panels, DSS, clamping, training signal for color phase reference, and the enhancement package. The enhancement package was not created at baseband, and therefore is not processed at baseband at the receiver. The enhancement package is disassembled in a manner complementary to the manner in which it was assembled. That is, the individual Yh, Crh and LD components will be placed in their correct two-dimensional spectral locations, Qh and Ih will be reconstructed from Crh, and with reconstructed Y1, Q1 and I1 signals, will be recombined to produce the original HDTV signals.

The enhancement package is to be heterodyned down from IF to the 6 MHz band in the vicinity of 8 MHz to 14 MHz. The skirt for the enhancement package before heterodyning up at the encoder begins at fu, which is in the vicinity of 8 MHz. The m-th harmonic of fh, which is used to heterodyne the enhancement package up at the encoder (fu=m·fh), is used to heterodyne the package down (fd=fu). In order to heterodyne the package down from the IF carrier frequency fif to fd, fif is offset by an amount equal to fd. By heterodyning the enhancement package at fif with fd·m=fif−fd, the enhancement package is brought down to fd (in the vicinity of 8 MHz to 14 MHz). That is, the difference frequency resulting from the heterodyning process is fif−(fif−fd), or the desired value of fd.

Just as at the encoder, all heterodyning signals at the decoder are derived from a reference signal at the horizontal line rate, fh, in this case provided by two channel decoder 115. The signal fd is produced in phase lock loop frequency multiplier 119 which produces fd=fh·m. The signal fdm is produced in mixer 121 which mixes the local oscillator signal fif from demodulator 117 with fd to produce fdm=fif−fd.

Figure 7:
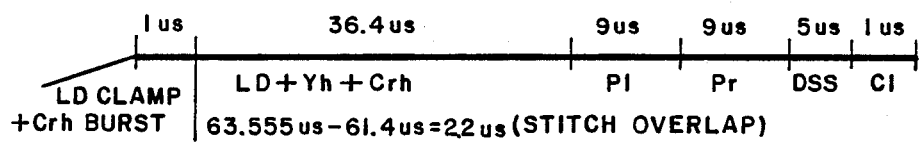
FIG. 7 illustrates the time multiplexed utilization of each horizontal line time in the enhancement signal channel.
Figure 8:
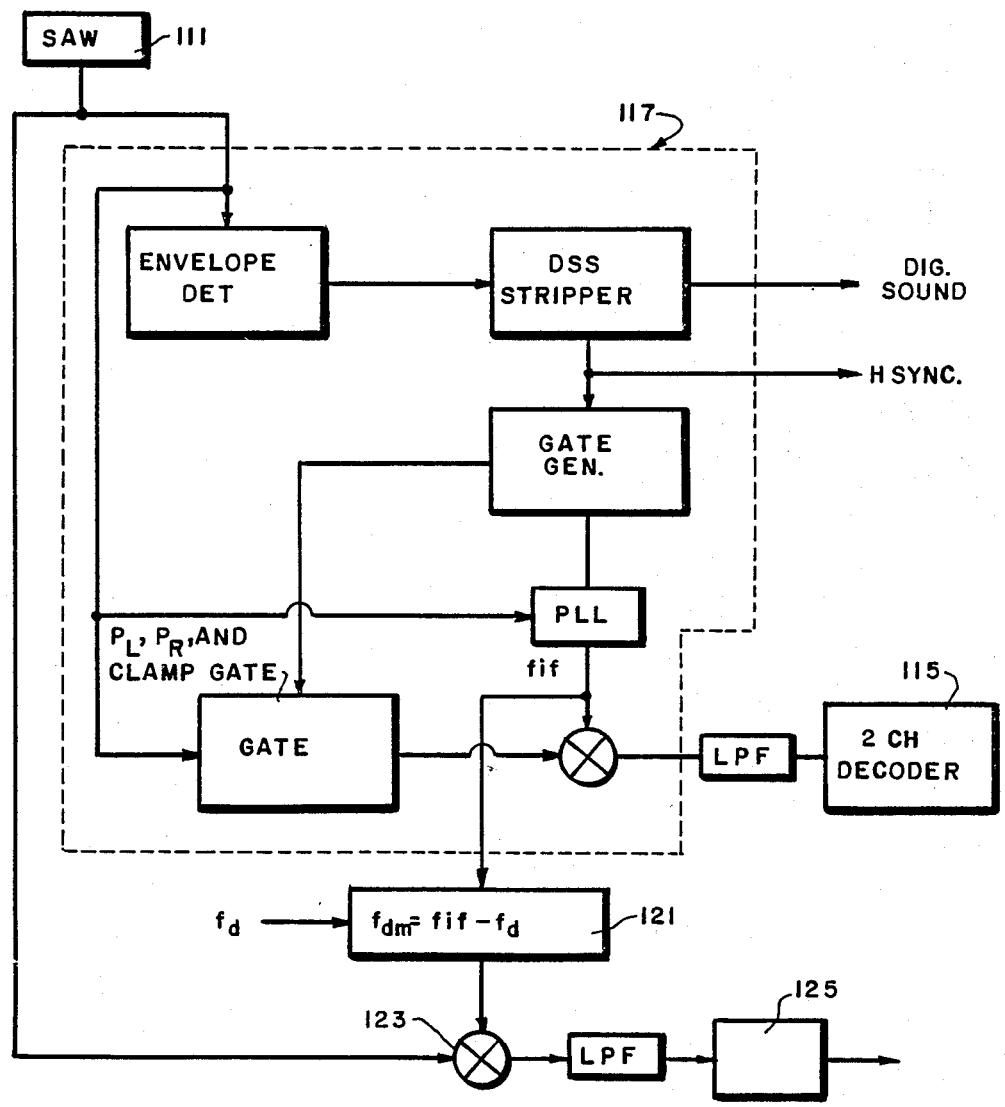
FIG. 8 is a block diagram showing the sampled PLL demodulator of FIG. 3 in more detail

Demodulator 117 is shown in more detail in FIG. 8. Within demodulator 117 there are included an envelope detector for detecting the enhancement channel signal. The detected signal is passed through a DSS stripper that separates the digital sound signal and horizontal sync signals. Horizontal sync is used to trigger a gate generator that provides gating signals to a $P_L$, $P_R$ and CLAMP gate, and also to a phase lock loop circuit that operates at the enhancement channel intermediate frequency fif. Under control of the gate generator, the output of SAW 111 is gated through a mixer where it is heterodyned to baseband with fif and thence to two channel decoder 115 for the duration of the $P_L$, $P_R$ and clamp signal times (See FIG. 7, described below). During enhancement package time (see FIG. 7) the output of SAW 111 is heterodyned in mixer 123 with fd, produced by mixer 121, to produce the enhancement package in the 6 MHz, band in the vicinity of 8 MHz to 14 MHz as described above. A low pass filter may be placed between mixer 123 and gain deemphasis circuit 125.

Gain deemphasis is applied at 125 to compensate for the preemphasis that was given the enhancement package to improve the SNR during transmission. Gain deemphasis block 125 provides the corresponding amplitude gain deemphasis to linearize the transfer curve of the enhancement package.

It will be recalled that elimination of the horizontal blanking interval on the enhancement signal channel allowed for an increase at the source in the dynamic range of Yh, Crh, and LD. More specifically, the gains of Yh and Crh were increased by a factor 1.17 and the gain of the LD signal was increased by a factor 1.5. At the receiver, the dynamic range of the enhancement package to be processed as the LD signal is compressed by a factor of 1/1.17 at 127 and the dynamic range of the enhancement package to be processed as Yh and Crh is compressed by a factor of 1/1.5 at 129.

The output of dynamic range compression 129 is bandpass filtered at 131 in the range of 8-12 MHz. The input to bandpass filter 131 consists of Yh interleaved with the Crh and LD components, all time expanded 5:7 by the encoder circuitry. The output of bandpass filter 131 is essentially the time expanded signals Yh and Crh. The output of bandpass filter 131 is vertically high pass filtered by vertical high pass filter 133 above 120 cph. Vertical high pass filter 133 effectively removes the Yh component leaving the Crh component at its output. This signal is subtracted from the output of bandpass filter 131 by an adder 134 to remove the Crh component therefrom, leaving only the Yh component at the output of adder 134. It will be recognized by a person skilled in the art that this method of separating the interleaved Yh and Crh components is analogous to separating NTSC luminance and chrominance by comb filtering.

In order to heterodyne the time expanded LD component at the output of dynamic range compression 127 down to baseband, it is necessary to generate a heterodyning frequency, fl. This is accomplished by phase lock loop frequency multiplier 135 which has as its input a reference signal of frequency fh provided by two-channel decoder 115. Demodulator 137 utilizes the heterodyning signal fl to bring the output of dynamic range compression 127 to baseband. The output of demodulator 137 is a baseband LD signal that is low pass filtered to 3 MHz by low pass filter 139.

It will be recalled that the Yh component was vertically decimated by a factor of 2 at the encoder. This process is substantially reversed by a vertical interpolator 141 which takes its input from the output of adder 134 and doubles the number of lines of Yh to convert from interlaced to progressive scan. Although time expanded, it should be noted that the Yh and LD components at the input to adder 134 are located in their correct spatial coordinates.

The output of vertical high pass filter 133 is line sequentially modulated high frequency chrominance, Crh. Crh is demodulated in line sequential demodulator 143. The chrominance subcarrier reference signal used by demodulator 143 is provided by block 144 which generates a continuous subcarrier that is phase locked to the training signal generated at the encoder.

The time expanded Qh and Ih components demodulated from Crh by line sequential demodulator 143 are vertically interpolated by vertical interpolators 145, 147, respectively, to quadruple the number of lines for a 525 line progressive scan display. These components are time compressed 7:5 by compressors 149, 151, respectively, to occupy 26 μsec of active line time. Baseband Yh and baseband LD are added in adder 153 and compressed 7:5 in compressor 155, reversing the expansion imparted to these signals at the encoder.

The lower band of luminance information from DC to 11.2 MHz is processed by two-channel decoder 115. This component, Yl, is combined with the high-frequency luminance component, Yh, and adder 157 to produce the wideband luminance signal, Y. Similarly, the low-frequency component, Ql, of the chrominance signal is combined in an adder 159 with the high-frequency component, Qh, to produce a wideband chrominance component, Q. Likewise, the low-frequency component Il of the chrominance signal is combined in an adder 161 with the high frequency component Ih, to produce the wideband chrominance signal, I. Wideband Y, Q, and I may be combined in a matrix 163 to reproduce original wideband signals, R, G, and B. These signals replicate the original format having 525 lines per frame progressively scanned, 59.94 frames per second and an aspect ratio of 16:9.

In summary, the present invention extends the horizontal resolution of the luminance and chrominance video signals in a two-channel HDTV system. Horizontal luminance resolution is extended to the equivalent of 495 TV lines per picture height (TVL), and horizontal chrominance resolution is extended to the equivalent of 175 TVL. This extension and video frequency response requires no increase in channel bandwidth. This compatible bandwidth extension technique, using spectrum interleaving and a novel heterodyning approach, is applicable to other line formats, aspect ratios and transmission schemes.

Figure 4:
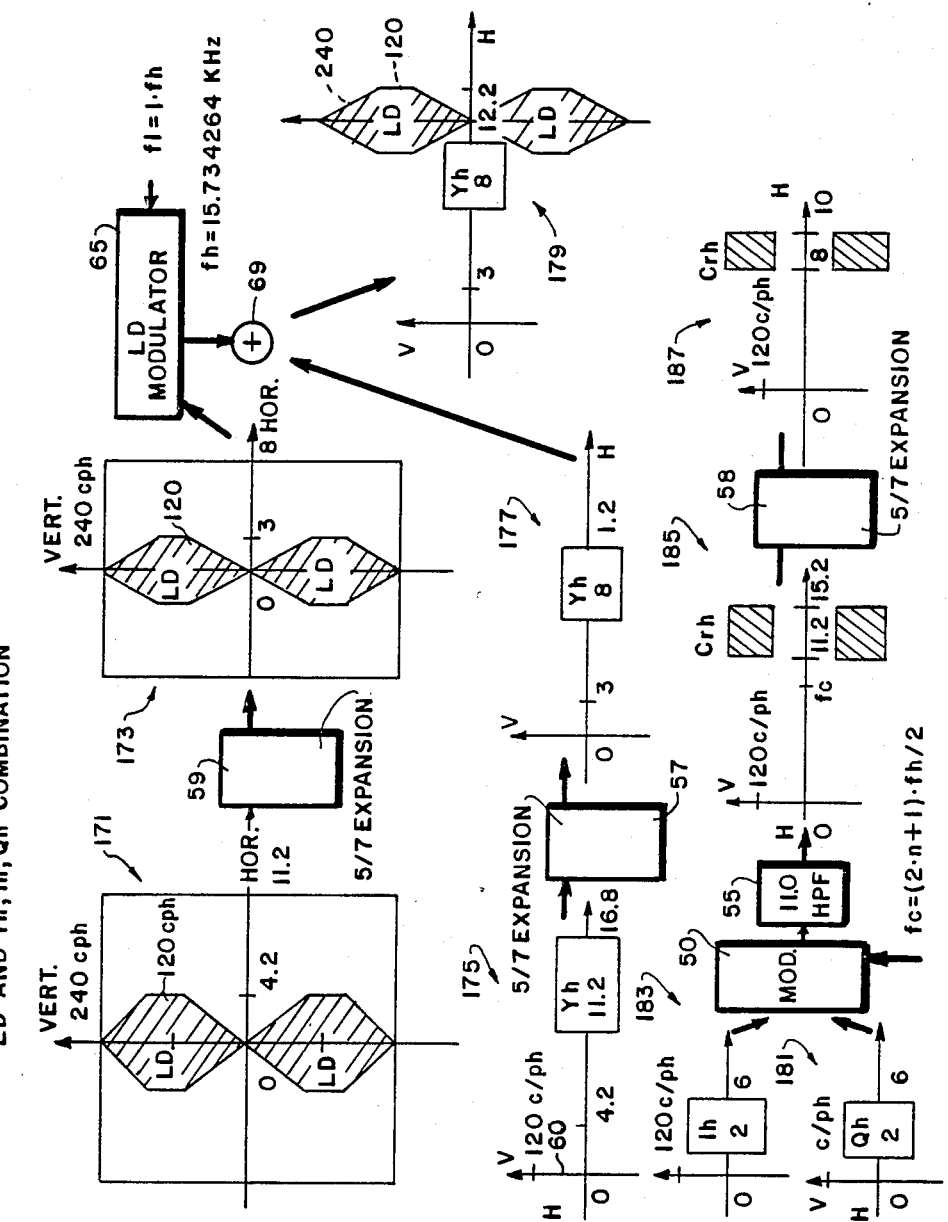
FIG. 4 illustrates the two-dimensional spectra of the components of the enhancement package at several places in the system.

A fuller understanding of the creation of the enhancement package and the spectral relationship of the various components may be had by reference to FIG. 4, which illustrates the two-dimensional spectra of the various components at several places in the system. For example, the line differential signal (LD) generated by two channel encoder 35 is shown at 171. The LD component at this location has a vertical frequency extent of approximately 240 cph (the Nyquist limit) and a horizontal frequency extent of approximately 0–4.2 MHz. After 5–7 expansion in a time expander 59, the vertical frequency remains the same while the horizontal is reduced to approximately 0–3.0 MHz. The resulting active line time is nominally (7/5) (26 μsec), or 36.4 μsec. The 10.4 μsec. increase in LD time over the disclosure in U.S. Pat. No. 4,694,339, is permitted by eliminating the horizontal blanking interval.

The two-dimensional spectra of the extended luminance horizontal resolution signal, Yh, are illustrated at 175. Yh nominally carries 26 μsec. of video information from 11.2 MHz to 16.8 MHz. Yh should overlap Yl slightly in the vicinity of 11.2 MHz to enable proper reconstruction of the complete wideband luminance signal at the receiver. That is, a spatial stitching of the low and high frequency components as required at the two channel HDTV receiver. This signal is vertically prefiltered and decimated 2:1, limiting the vertical frequency to 60 cph. Time expansion of Yh by a factor of 5:7 yields a spectrum from (5/7) (11.2 MHz) to (5/7) (16.8 MHz), or from 8.0 MHz to 12.0 MHz, as depicted at 177. The signal carries 4 MHz of information for (7/5) (26 μsec.), or 36.4 μsec.

The diagram at 179 illustrates how the time expanded and frequency shifted LD signal neatly nests with the time expanded Yh component.

Figure 2B:
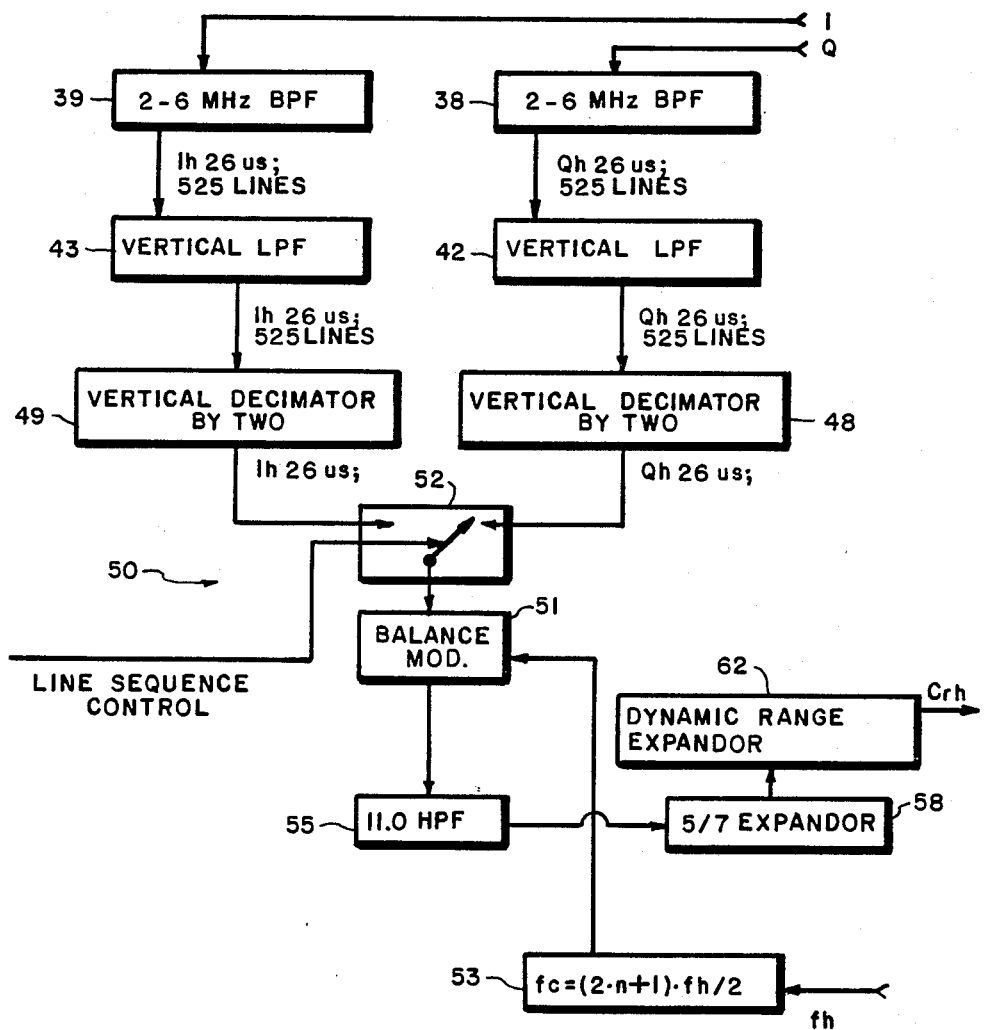

The chrominance high-frequency resolution signals are treated as Ih and Qh from 2 MHz to 6 MHz. Ih and Qh should overlap Il and Ql slightly in the vicinity of 2 MHz to enable proper reconstruction of the complete wideband chrominance signal at the receiver. The signals are vertically prefiltered and decimated 2:1 as shown in FIG. 2b. The resulting two-dimensional spectra for Qh and Ih are shown, respectively, at 181 and 183 in FIG. 4. These signals are modulated in a line sequential manner (one line Ih, next line Qh) at a frequency that is an odd multiple (n) of one-half of the line rate to produce the signal Crh illustrated at 185. The value n is selected as described above to interleave the harmonics of the chrominance signals within the spectral wells of the luminance signal, Yh, without interfering with the spectra of the LD signal. It will be recalled that Yh starts at 8 MHz after time expansion as shown at 177. The modulated chrominance signal, Crh, should interleave with Yh starting at 8 MHz. For 5:7 time expansion of the chrominance signal after line sequential modulation, the harmonic selected should place Crh starting at 11.2 MHz, because (5/7) (11.2 MHz) equals 8 MHz.

Figure 5:
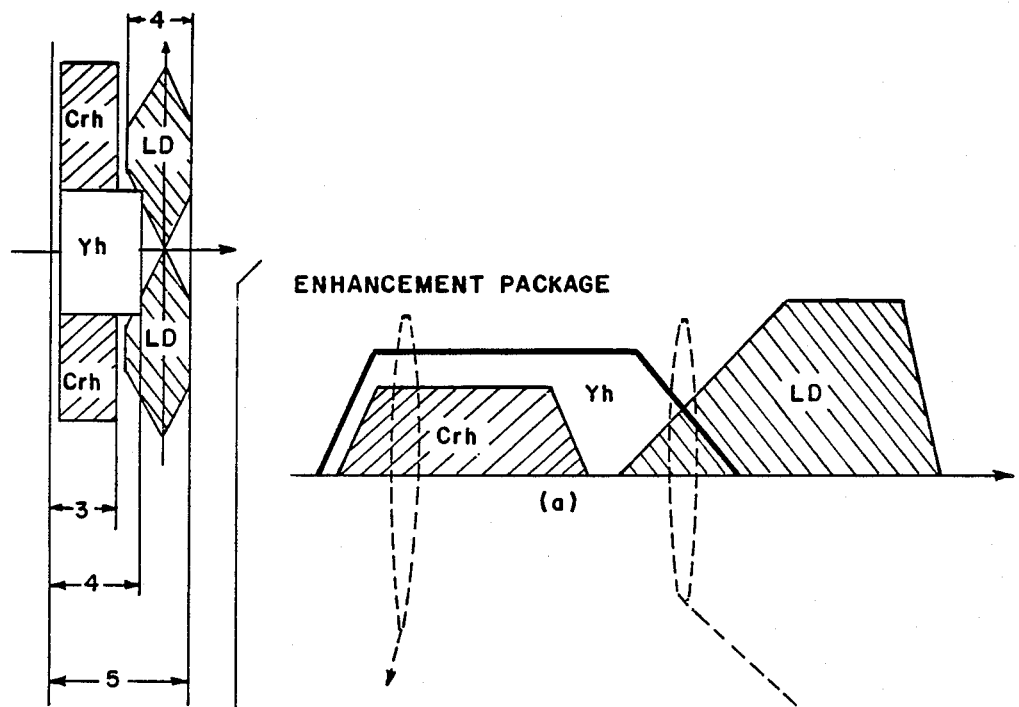
FIG. 5 shows the two-dimensional spectra of all of the components of the enhancement package as broadcast over the enhancement channel.

The modulated Crh signal is added to the Yh and LD components to provide the complete (Yh, Crh, LD) enhancement package, illustrated in its two-dimensional spectra in FIG. 5. This package encompasses only higher spatial frequency luminance and chrominance information. The package contains time expanded information which occupies nominally 36.4 μsec. of line time. Thus, the LD signal time is utilized more efficiently by interleaving high frequency luminance and chrominance information, and time expanding to utilize the horizontal blanking interval time. This expansion allows the interleaving artifacts to be minimized by spreading the associated two dimensional spectra within the constraints of the 6 MHz channel bandwidth. Amplitude preemphasis at the transmitter boosts the gain of these components to achieve a corresponding improvement in the signal to noise ratio at the receiver, which has complementary gain deemphasis on the second channel.

The conventional one-dimensional representation of the enhancement package is shown at (a) in FIG. 6. The interleaving of Crh component with the Yh component is illustrated at (b) in FIG. 6 and the interleaving of the LD component with the Yh component is shown at (c) in FIG. 6.

The time multiplex utilization of a typical scan line in the enhancement signal is illustrated in FIG. 7. LD clamp and Crh burst occupies approximately 1 MHz. The enhancement package (Yh+Crh+LD) occupies approximately 36.4 μsec. The left and right panel signals, Pl and Pr, together occupy 18 μsec. The digital stereo sound (DSS) signal occupies 5 μsec. The Cl signal provides a one μsec. clamping period for the side panels. In all, 61.4 μsec. are utilized out of a total of 63.555 μsec. This leaves 2.2 μsec. which is advantageously used to provide signal overlap of the left and right panel signals with the center image signal. See, U.S. patent application Ser. No. 057,849, filed June 2, 1987, cited above.

While certain representative embodiments and details have been shown for the purpose of illustrating the present invention, it will be apparent to persons skilled in the art that various modifications may be made in the disclosed system without departing from the spirit and scope of the disclosed invention.

What is claimed is:

1. A system for transmitting a television signal for producing a high definition television image, comprising:
   (a) means for separating said television signal into a first signal and a second signal having separate frequency bands, said second signal comprising a line differential signal for providing enhanced vertical detail in said television image, a wide bandwidth luminance signal and a wide bandwidth chrominance enhancement signal;
   (b) first filter means for receiving said wide bandwidth luminance signal and for passing a high frequency component thereof;
   (c) second filter means for receiving said wide bandwidth chrominance enhancement signal and for passing high frequency components thereof;
   (d) a first vertical filter means connected to said first filter means for receiving and vertically filtering said high frequency component of said luminance signal;
   (e) second vertical filter means connected to said second filter means for receiving and vertically low pass filtering said high frequency components of said chrominance enhancement signal; and
   (f) means connected to said first vertical filter means and said second vertical filter means for frequency interleaving most of the frequency band of said high frequency component of said luminance signal with said high frequency components of said chrominance enhancement signal and further frequency interleaving the upper portion of said frequency band with said line differential signal.

2. A method for transmitting a television signal providing a television image having improved horizontal resolution of luminance and chrominance, comprising the steps of:
   (a) receiving a high definition wide bandwidth television signal which comprises a line differential signal for providing enhanced vertical detail in said television image, a luminance signal and a chrominance enhancement signal, said bandwidth exceeding that which may be transmitted over a single television channel in standard format;
   (b) dividing said luminance signal into a lower frequency luminance component that may be transmitted over a single channel in standard format and a higher frequency luminance component;
   (c) dividing said chrominance signal into lower frequency chrominance components that may be transmitted over a single channel in standard format and higher frequency chrominance components which constitute a chrominance enhancement signal;
   (d) combining said lower frequency luminance component and lower frequency chrominance components to form a composite television signal compatible with standard television receivers;
   (e) transmitting said composite television signal via a first television channel;
   (f) frequency interleaving most of the frequency band of said higher frequency luminance component with said higher frequency chrominance components and further interleaving the upper portion of said frequency band with said line differential signal so as to form an image enhancement signal; and
   (g) transmitting said image enhancement signal via a second television channel.

3. A receiving system for forming a high definition television image by combining a received first image signal which is compatible with standard television receivers and a received image enhancement signal, said system comprising:
   (a) means for receiving said first image signal and deriving luminance and chrominance therefrom;
   (b) means for receiving said enhancement signal and deriving therefrom a high frequency luminance signal which is frequency interleaved over most of its frequency band with a high frequency chrominance signal and is further interleaved over the upper portion of said frequency band with a line differential signal for providing enhanced vertical detail in said television image; and
   (c) means connected to said first and second receiving means for combining said luminance and chrominance components of said first image signal with said high frequency luminance signal, said high frequency chrominance signal and said line differential signal to form a high definition television signal for producing said high definition television image.

4. The system of claim 1 wherein said first and second signals are transmitted over first and second channels of different frequencies.

5. The system of claim 1 wherein said high definition television signal provides an image having a wider aspect ration than the image corresponding to said first image signal.

6. The system of claim 3 wherein said high definition television signal provides an image having a wider aspect ratio than the image corresponding to said first image signal.

* * * * *